United States Patent
Loewen et al.

(10) Patent No.: US 11,525,717 B2
(45) Date of Patent: Dec. 13, 2022

(54) VIBRATION-BASED ACOUSTIC FLOWMETERS WITH A VIBRATION DETECTOR DETECTING VIBRATIONS CAUSED BY A STANDING WAVE

(71) Applicant: GE-Hitachi Nuclear Energy America LLC, Wilmington, NC (US)

(72) Inventors: Eric P. Loewen, Wilmington, NC (US); James P. Sineath, Summerville, SC (US); Dean D. Molinaro, Clearwater, FL (US); William C. Dawn, Stafford, VA (US); William J. Garcia, Wilmington, NC (US); Oscar L. Meek, Wilmington, NC (US); Patrick K. Day, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 95 days.

(21) Appl. No.: 16/863,544

(22) Filed: Apr. 30, 2020

(65) Prior Publication Data
US 2020/0273590 A1  Aug. 27, 2020

Related U.S. Application Data

(62) Division of application No. 15/469,735, filed on Mar. 27, 2017, now Pat. No. 10,650,931.

(51) Int. Cl.
| | |
|---|---|
| *G01F 1/66* | (2022.01) |
| *G21C 17/032* | (2006.01) |
| *G21C 17/10* | (2006.01) |
| *G01F 1/325* | (2022.01) |
| *G21C 13/02* | (2006.01) |

(52) U.S. Cl.
CPC .............. *G01F 1/66* (2013.01); *G01F 1/3266* (2022.01); *G21C 17/032* (2013.01); *G21C 17/10* (2013.01); *G21C 13/02* (2013.01)

(58) Field of Classification Search
None
See application file for complete search history.

(56) References Cited

U.S. PATENT DOCUMENTS

| | | | | |
|---|---|---|---|---|
| 4,922,759 | A | * | 5/1990 | Steiner .................. G01F 1/3218 73/861.22 |
| 5,347,873 | A | | 9/1994 | Vander Heyden |
| 5,880,377 | A | | 3/1999 | Celik |
| 8,567,259 | B1 | | 10/2013 | Ballard et al. |
| 2010/0307262 | A1 | * | 12/2010 | Lewicke ............... G01F 1/3266 73/861.22 |
| 2016/0003655 | A1 | | 1/2016 | Galvez |

OTHER PUBLICATIONS

EPO, Supplementary European Search Report in corresponding EP Application 18778062, dated Oct. 28, 2020.

* cited by examiner

*Primary Examiner* — Harshad R Patel
(74) *Attorney, Agent, or Firm* — Ryan Alley IP

(57) ABSTRACT

Vibration-based flowmeters are useable in inaccessible nuclear reactor spaces. Pipe-organ-type flowmeters include a passage with an opening constricted, and subsequent widening section. An extension and outlet that create turbulence in the flow at the outlet create a standing wave and vibration in the extension and/or entire flowmeter. A flow rate of the fluid through the flowmeter can be calculated using length of the passage and/or known properties of the fluid. Multiple flowmeters of customized physical properties and types are useable together.

12 Claims, 7 Drawing Sheets

VIBRATION-BASED ACOUSTIC FLOWMETERS WITH A VIBRATION DETECTOR DETECTING VIBRATIONS CAUSED BY A STANDING WAVE

RELATED APPLICATIONS

This application is a divisional of, and claims priority under 35 U.S.C. §§ 120 and 121 to, co-pending application Ser. No. 15/469,735 filed Mar. 27, 2017, which is incorporated herein by reference in its entirety.

BACKGROUND

FIG. 1 is cutaway view of a related art reactor pressure vessel 1, such as an ESBWR pressure vessel. Vessel 1 includes a core 15 within core shroud 10. Core shroud 10 separates upward flow of coolant through core 15 from downward flow in downcomer annulus 4, received from main feedwater line 3 and from liquid separated from steam separators and dryers. A feedwater cleanup system 12 may recirculate and filter feedwater from reactor vessel 1 into main feedwater line 3, and one or more control rod drives 50 may extend through a bottom of vessel 1 for control and monitoring of the conditions in core 15. As liquid coolant boils in core 15, a heated mixture of steam and water flows upward into steam separators and dryers that separate liquid water from the steam-water mixture rising therethrough. Liquid coolant from the steam separators and dryers is directed into downcomer annulus 4 between the outer wall 10 and inner wall of vessel 1 for recirculation. The dried steam exiting steam dryers is then directed into main steam lines 2 for electrical power production.

As described in ESBWR Design Control Document, Tier 2, 2013, incorporated by reference herein in its entirety, flow through core 15 is derived from a heat balance calculation; there is no direct measurement of fluid flow through core 15. The balance of heat and overall energy created and extracted from core 15 allows operators to estimate or model whole core flow. For example, for an ESBWR at 100% power, 31,553 tons/hr of coolant may enter a lower core section. This derived core flow may be directly presented to operators as a measurement of plant status as well as a diagnostic aid in transient conditions.

SUMMARY

Example embodiments include flowmeters that work through use of induced vibration or sound in a particular flow, including those in inaccessible nuclear reactor spaces. An example embodiment flowmeter includes a solid extension that blocks flow in a fluid flow path, such as in a nuclear reactor downcomer annulus between a core shroud and reactor vessel, and a detector that picks up vibrations caused by vortex shedding around the extension. A computer processor can use the detected frequency of the vibrations to calculate a flow rate of the fluid past the extension, such as by using known shape of the extension, fluid flow characteristics such as density, an empirical relationship between vibration frequency and flow speed, etc. For example, the computer processor may use a Strouhal number for an extension having a round outer surface to calculate a flow speed from the surface diameter and detected vortex shedding frequency. The extension may have a natural oscillation frequency to match the frequency of vortex shedding at expected flow speed(s) in order to permit direct monitoring of vibration in the extension. As such, several extensions, each with unique oscillation frequencies, may be used to cover a range of frequencies of vortex shedding and thus a complete range of flow speeds in the space.

Another example embodiment may be a pipe-organ-type flowmeter where the fluid flows through a passage in the flowmeter. An opening of the flowmeter may be constricted, followed by a widening section with a wedge or other extension and outlet that create turbulence in the flow at the outlet. The turbulence or vorticing in the passage create a standing wave in the fluid flow, which induces vibration in the extension and/or entire flowmeter. A vibration detector and processor can transform the vibration frequency into a flow rate of the fluid through the flowmeter using the length of the passage and/or known properties of the fluid. The passage may widen at an exit and/or include several bends or curves to achieve a desired length and frequency of vibration in the passage. Embodiments are useable together, such as installing a pipe-organ-type flowmeter through an extension-type flowmeter with vibrational detection of both vortex shedding and standing wave oscillations detected in both. Of course, embodiments are useable separately, with independent or exclusive installations in the flow passage.

Example methods include installing an extension, potentially with a pipe-organ-type opening into a passage where flow is desired to be directly measured and then detecting a frequency of vibration caused by a standing wave or vortex shedding in/around the extension. Flow rate is then calculated based on the detected oscillation frequency. For example, using a guessed Strouhal number, a width of the extension, and the frequency, a flow rate can be determined. This flow rate may then be checked by calculating a Reynolds number of the flow using the calculated flow rate and comparing an empirical Strouhal number from that Reynolds number against the guessed Strouhal number. If the empirical and guessed Strouhal numbers are sufficiently close, the rate is accepted; otherwise, a new Strouhal number is guessed and the method repeated. Similarly, example methods can compare flow rates determined with a guessed Strouhal number in extension-type embodiment(s) with a flow rate determined by pip-organ-type embodiment(s) to verify accuracy of determined flow rate. Still further, a lack of vibration detected in a pipe-organ-type embodiment may indicate the presence of two-phase flow.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
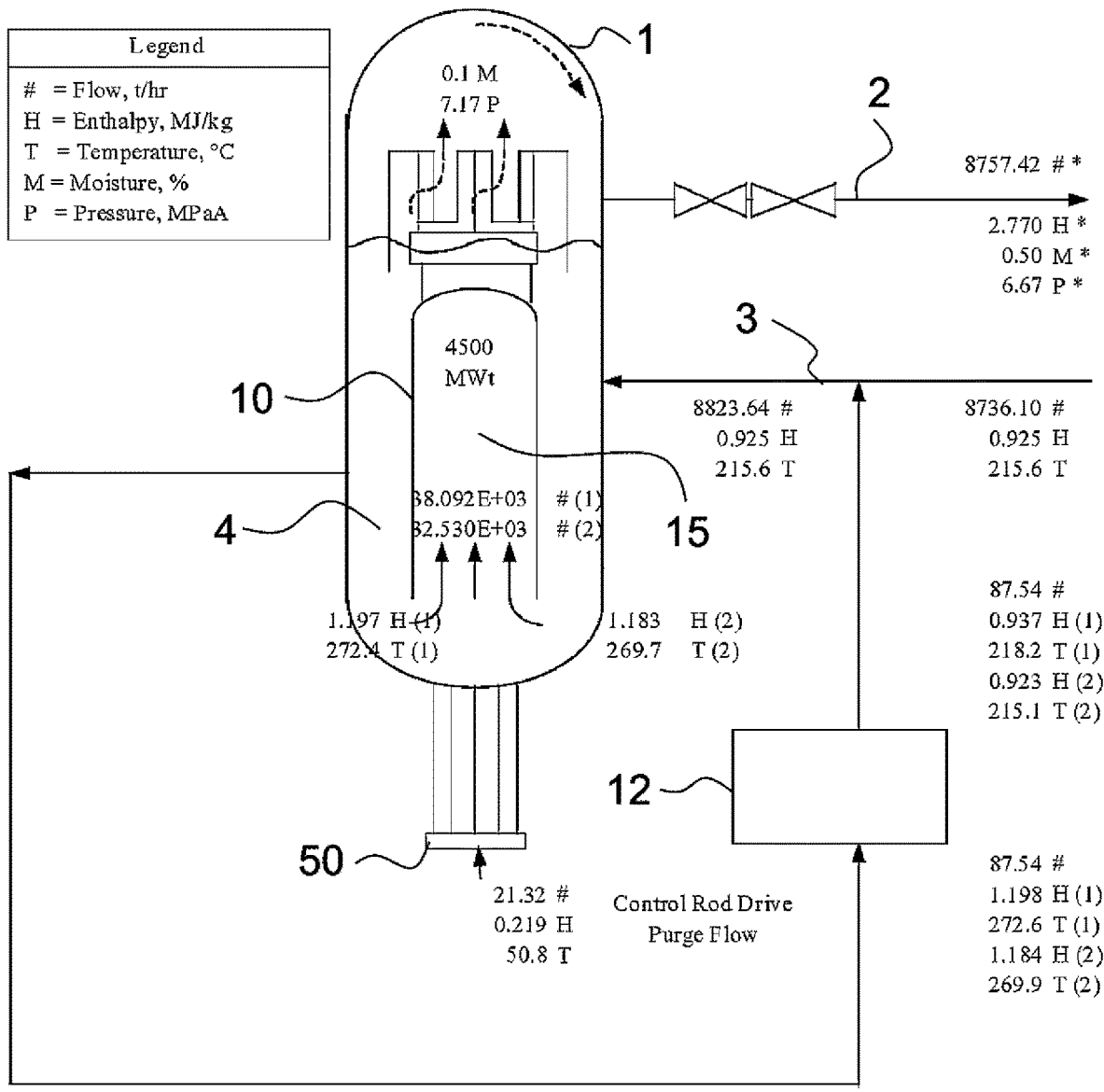
FIG. 1 is an illustration of a related art nuclear power reactor heat balance schematic.

Because this is a patent document, general broad rules of construction should be applied when reading and under-standing it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a," "an," and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have newly recognized that a heat-balance derivation of reactor coolant/moderator flow gives only general, non-precise values for whole core flow. Direct and/or independent measurement of fluid flow at exact positions within a nuclear reactor, especially in a larger core and reactor like an ESBWR, provides an important verification to heat balance flow estimates as well as more precise reflection of reactor conditions and transient scenarios. Particularly, accurate measurement of total flow down into a downcomer annulus, accounting for all recirculated and injected feedwater, is useful for confirming total coolant/moderator flow up through a core and precise, direct flow measurements enable better calculation of stability margins required for core safety compliance as well as better strategic operation of control elements. Direct/non-derived measurement of core flow is further helpful at startup and shutdown and to diagnose undesired or transient scenarios, including core power oscillations and burnup variations. Example embodiments described below address these and other problems recognized by the Inventors with unique solutions enabled by example embodiments.

The present invention is acoustic flowmeters and methods of using the same. In contrast to the present invention, the small number of example embodiments and example methods discussed below illustrate just a subset of the variety of different configurations that can be used as and/or in connection with the present invention.

Figure 2:
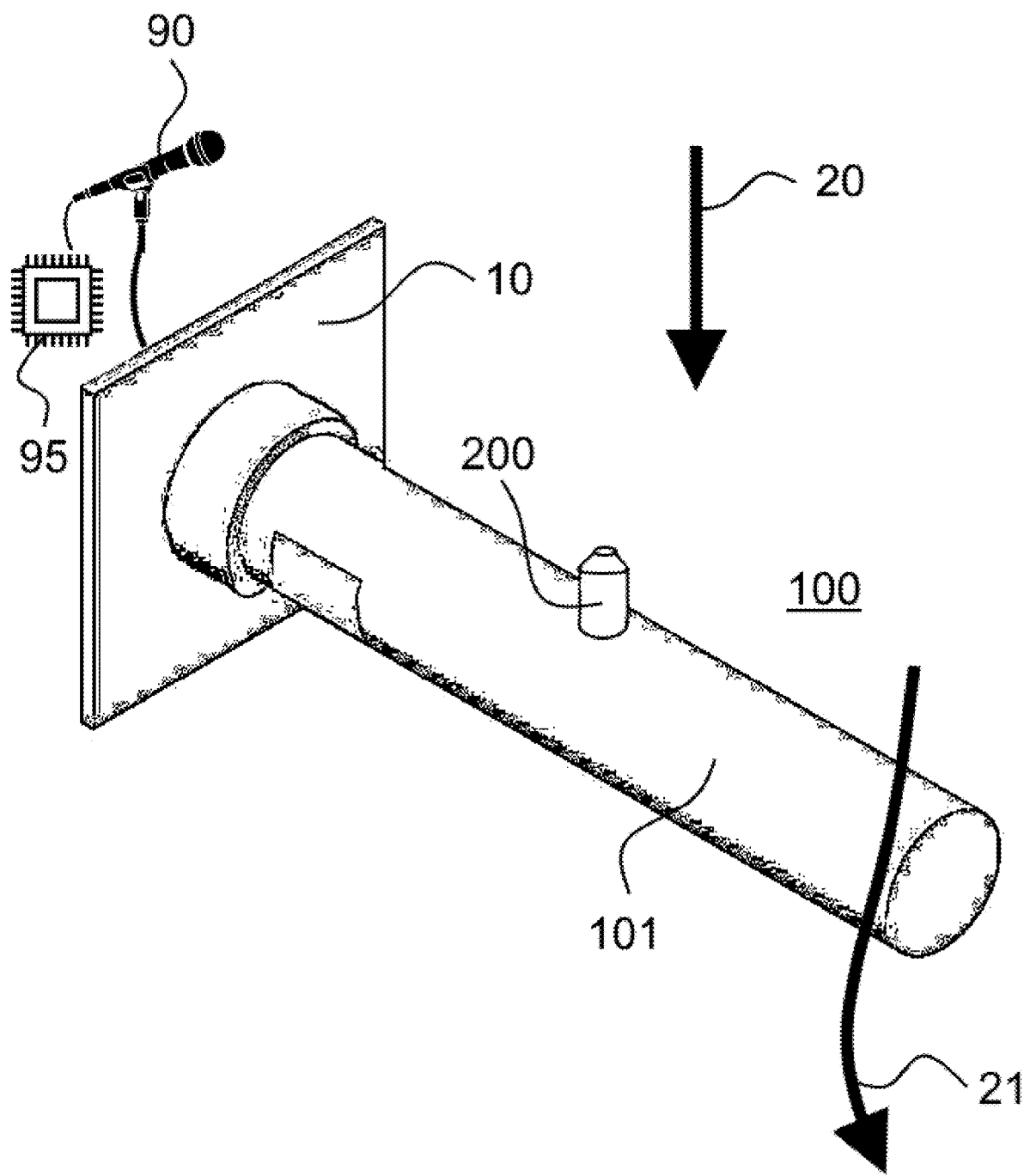
FIG. 2 is perspective view of an example embodiment acoustic flow meter.

FIG. 2 is an illustration of an example embodiment acoustical flowmeter 100 useable in an operating nuclear reactor environment. As shown in FIG. 2, example flowmeter 100 includes projection 101 shaped to extend perpendicularly to and into a fluid flow 20. Projection 101 may be secured to a base to ensure its continued perpendicular positioning even in heavy flows. For example, projection 101 may be installed on a wall of a downcomer, such as an exterior of core shroud 10, of a boiling water reactor or ESBWR (FIG. 1) and, during operation, immersed in purified water or other coolant/moderator 20 flowing past projection 101. Because of the size of projection 101 and typical flow velocity, flow 20 undergoes diversions 21 from laminar flow around projection 101, creating a small amount of turbulence and voiding around projection 101.

Figure 3:
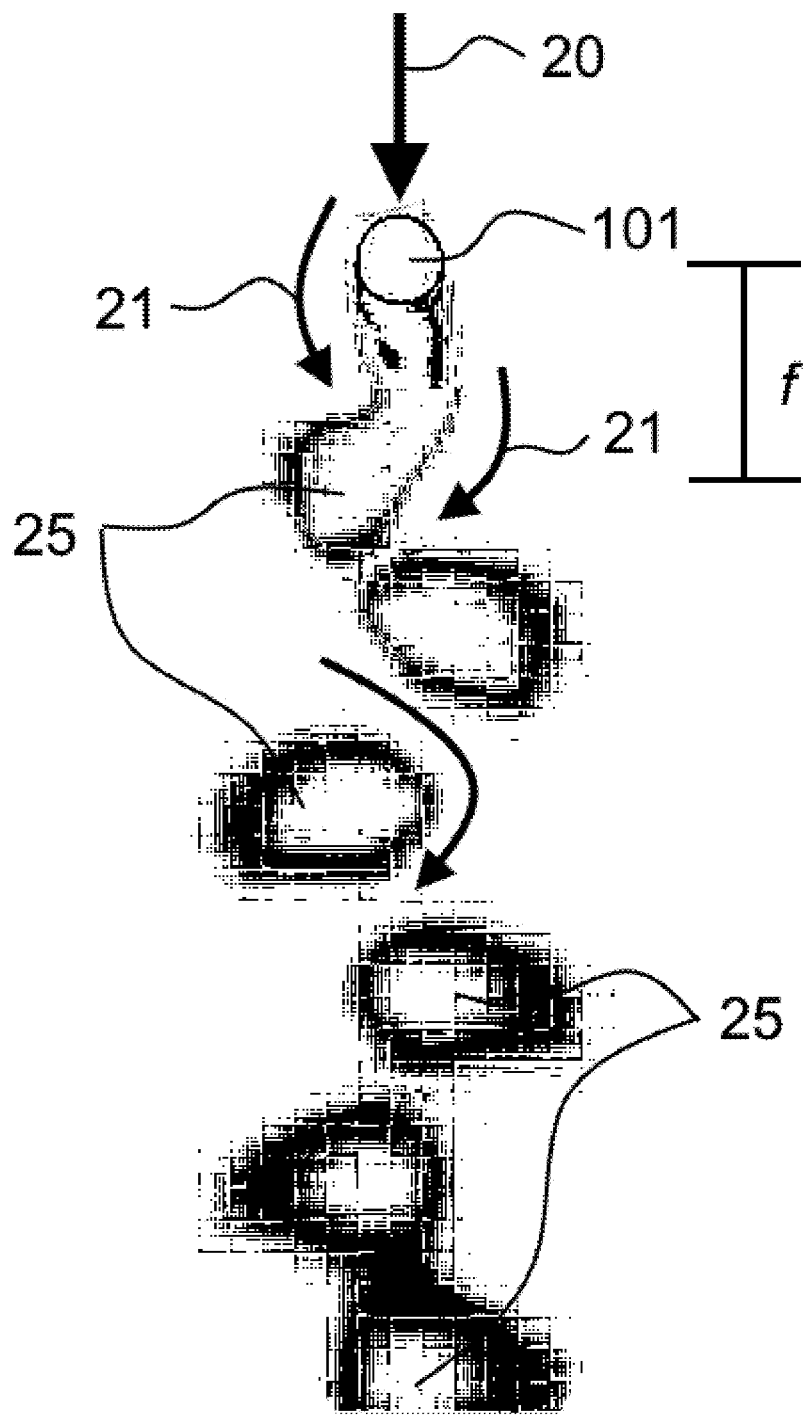
FIG. 3 is an illustration of vortex shedding and induced vibration in an example embodiment acoustic flow meter.

FIG. 3 is a front view of example embodiment flowmeter 100 in fluid flow 20. As seen, at sufficient velocity, flow 20 breaks, or sheds, from projection 101, creating a trailing void 25. As flow diversions 21 proceed downstream in surrounding flow, they generally correct back from an initial diversion 21, oscillating back and forth. This creates opposite voids, or turbulent areas, 25 in opposite positions as each diversion 21 corrects back to vertical flow downstream. This phenomenon, known as vortex shedding, thus creates an oscillating flow back-and-forth between voids 25, of frequency f (showing one voiding cycle in a given time period). The vortex shedding may induce vibration in projection 101 and nearby structures of frequency f, or related vibration oscillation.

Oscillations in position and pressure—vibration—in projection 101 may be detected and/or converted to electrical signals by vibration detector 90, such as a microphone, another acoustic pickup, transducer, etc. Vibration detector 90 may be directly coupled with projection 101, with a pickup embedded in or connected to projection 101. Alternatively, vibration detector 90 may be downstream or even embedded in or on another side of a structure such as core shroud 10 from projection 101 yet still pick up vibration caused in projection 101 or other nearby structures by the vortex shedding. Vibration detector 90 may be self-powered by the vibration, and transmit a relatively small electrical signal that may be amplified elsewhere; additionally or alternatively, vibration detector 90 may include a battery or electrical grid connection and transmit fully amplified electrical signals and/or wireless signals generated from the vibration. For example, a calibrated acoustical pickup on an external side of reactor pressure vessel 1 may be powered through electrical connections in a containment building and may detect the vibration in fluid flow created by projection 101 in an annular downcomer inside reactor vessel 1 when properly tuned to expected frequencies and filtering out other background noise from vessel 1 and surroundings.

With a vibration frequency detected by vibration detector 90, a flow rate may be determined. This determination may be made by computer processor 95 receiving vibrational frequency from vibration detector 90, including a local processor and/or a remote plant computer receiving, and potentially amplifying and cleaning, the data through a communicative connection with vibration detector 90. The determination of flow rate may be made from a determinative or historically-measured relationship between the vortex shedding frequency f and flow velocity. For example, if projection 101 is substantially cylindrical with a generally smooth, wetable surface, the relationship between vortex shedding frequency from projection 101 and rate of fluid flow 20 is given by the Strouhal equation:

$$St=(f*d)/U \quad (1)$$

where f is the detected frequency by vibration detector 90 or a vortex shedding frequency derived from the same; d is the diameter of projection 101 into flow 20, and U is the steady stream velocity of flow 20 being solved for. The Strouhal number, St, may initially be unknown but guessed at using historically-accurate numbers for flow rates or a reasonable guess, such as 0.2, for typical downcomer flow rates and conditions.

Figure 4:
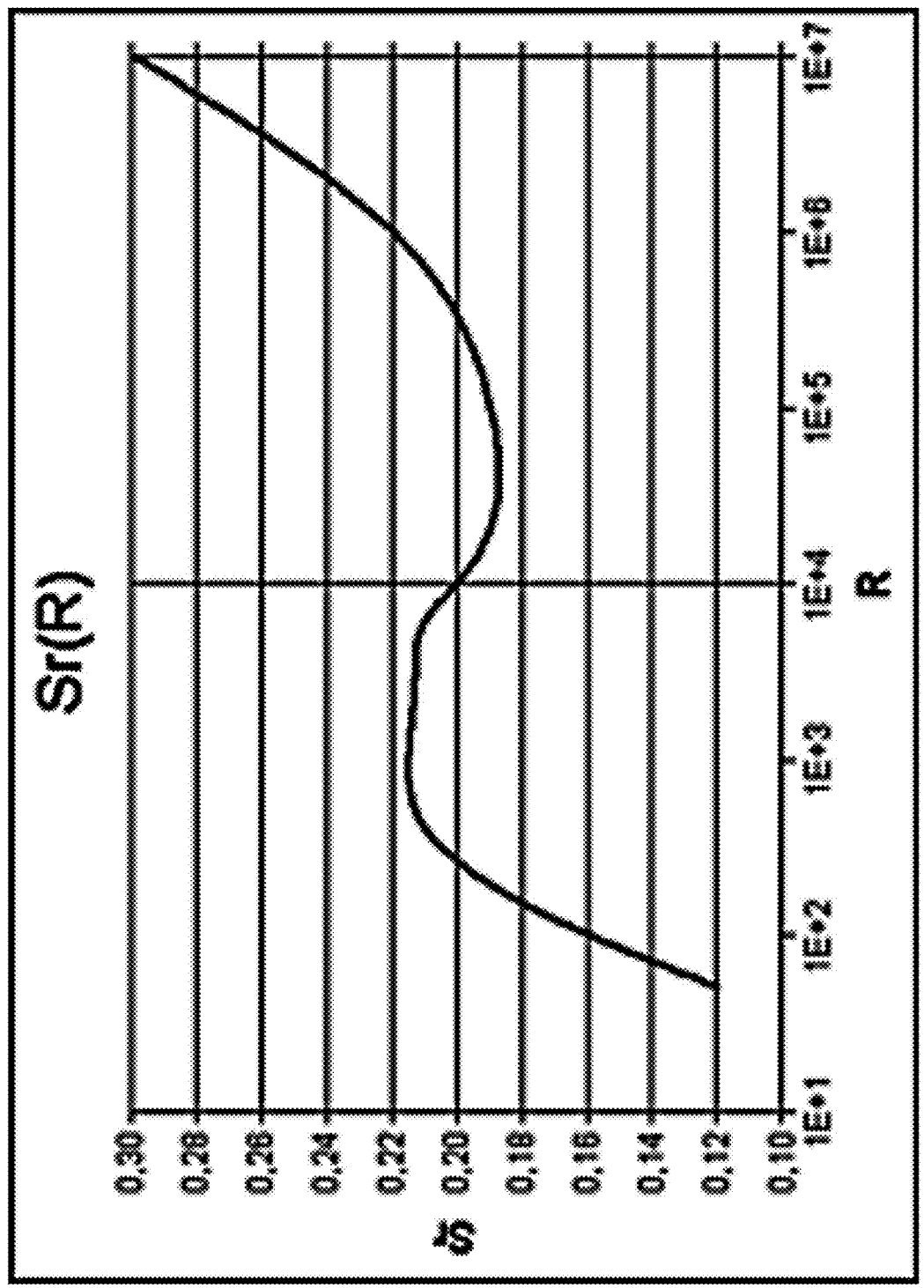
FIG. 4 is an illustration of an empirical relationship between Reynold's and Strouhal numbers.

The Strouhal number can be verified through empirical data, yielding an even better result. FIG. 4 is an example graph relating Reynolds and Strouhal numbers from an empirical determination in controlled conditions. As such, by calculating the Reynolds number for the determined flow rate, the Strouhal number can be checked by the graph of FIG. 4 to ensure a sufficiently close fit. Reynolds number, assuming open flow around projection 101 in large hydraulic diameter conditions, such as in a typical boiling water reactor downcomer, is calculated by:

$$Re=(\rho*U*d)/\mu \quad (2)$$

where p is fluid density, U is the determined flow rate from equation (1), d is the diameter of extension 101, and μ is the fluid viscosity. The fluid density and viscosity are known from the coolant/moderator type and temperature and pressure in the downcomer or other flow space that surrounds projection 101. The calculated Reynolds number, Re, is then used to get an associated Strouhal number from FIG. 4, and this may be compared to the guessed or otherwise originally-used Strouhal number St in equation (1) to ensure a match. If the originally-used Strouhal number is outside of a tolerance or otherwise does not sufficiently match the associated Strouhal number from FIG. 4, a new Strouhal number may be guessed. The new guessed Strouhal number will likely be larger, but the results of the comparison will indicate which direction the guess should move. Once there is agreement between empirically-associated and guessed Strouhal numbers for a particular flow rate, the calculated flow rate is verified.

Of course, other analyses may be used to calculate flow rates from detected acoustic vibration information. For example, a direct empirical relationship between flow rate and vortex shedding frequency (or any shape/characteristic of extension 101) may be known, and the detected frequency may be used to directly calculate flow rate. Such analyses may be performed on an appropriately-programmed or configured computer processor(s) using the known physical characteristics of extension 101, fluid properties, and flow path characteristics. The computer may output the calculated flow rate from each example embodiment acoustical flowmeter 100 to a plant computer and/or operator, such as in a control room, for direct knowledge of coolant flow rate.

As discussed above, vortex shedding frequency f may be directly measured by vibration detector 90 and/or may be measured by vibration in extension 101, either directly or through a known relationship between vortex shedding frequency and extension vibration. If direct measurement of frequency in extension 101 is desired, such as for simplification or easier vibration detection in a solid structure like extension 101, extension 101 may be configured to ensure a vibrational characteristic that matches, or may be determinatively calculated from, vortex shedding frequency f used to determine flow velocity.

Extension 101 may be configured with a natural frequency covering expected vortex shedding frequencies, so that extension 101 will resonate, and vibrate at, the vortex shedding frequency f Most solid structures will vibrate only when exposed to certain frequencies of vortex shedding, so appropriate configurations and numbers of example embodiment acoustical flowmeter(s) 100 may be used in a flow 20. For example, the typical bandwidth of natural frequencies that will cause extension 101 to vibrate at a vortex shedding frequency f is given by:

$$\omega_{BW}=\omega_n\sqrt{((1-2\zeta^2)+(\zeta^4-4\zeta^2+2))} \quad (3)$$

where $\omega_n$ is the natural frequency of extension 101, and $\zeta$ is the damping ratio of extension 101 in the fluid determined from a modal analysis. A desired damping ratio may be achieved by varying stiffness of any vibrating part in a length/axial or width/radial direction, for example, to cover expected resonance frequencies for a given flow. Additive manufacturing, building a part, such as extension 101, through sequential add-ons or welds may permit easy customization of damping ratio and thus bandwidth of natural frequencies covered.

For example, if extension 101 is a cylindrical extension fabricated of a rigid material such as a metal with a relatively constant modulus of elasticity over a given range (i.e., does not plastically deform at expected frequencies), then the natural frequency $\omega_n$ is given by:

$$\omega_n=\alpha^2\sqrt{(E*I)/(m*L^4))} \quad (4)$$

where E is the modulus of elasticity; I is the moment of inertia ($\pi r^4/4$ for a cylinder); m is the mass; and L is the length of extension 101. For a structure having more than one harmonic node or natural frequency, a, is the modal number, which may be empirically determined. Using customization, such as through additive manufacturing, specific radii, lengths, and/or stiffnesses may be achieved to give extension 101 desired natural frequencies and modes, based on expected flow conditions and/or desired frequency coverage. The natural frequency is then divided by $2\pi$ to correlate with vortex shedding/vibrational frequency f used in equations (1) and (2).

As seen in the forgoing equations (3) and (4), extension 101 may be of a material, length, and radius that will give good coverage of expected vortex shedding frequencies f That is, example embodiment acoustic flowmeter 100 will vibrate and produce useable data for a flow rate range in flow 20 when properties of extension 101 are configured in accordance with the forgoing parameters to ensure resonance with the vortex shedding at expected flow rates. Of course, other shapes and structures of extension 101 may be chosen, with known material properties and natural frequencies determinable, to be useable as structures that vibrate in accordance with fluid flow.

Figure 6:
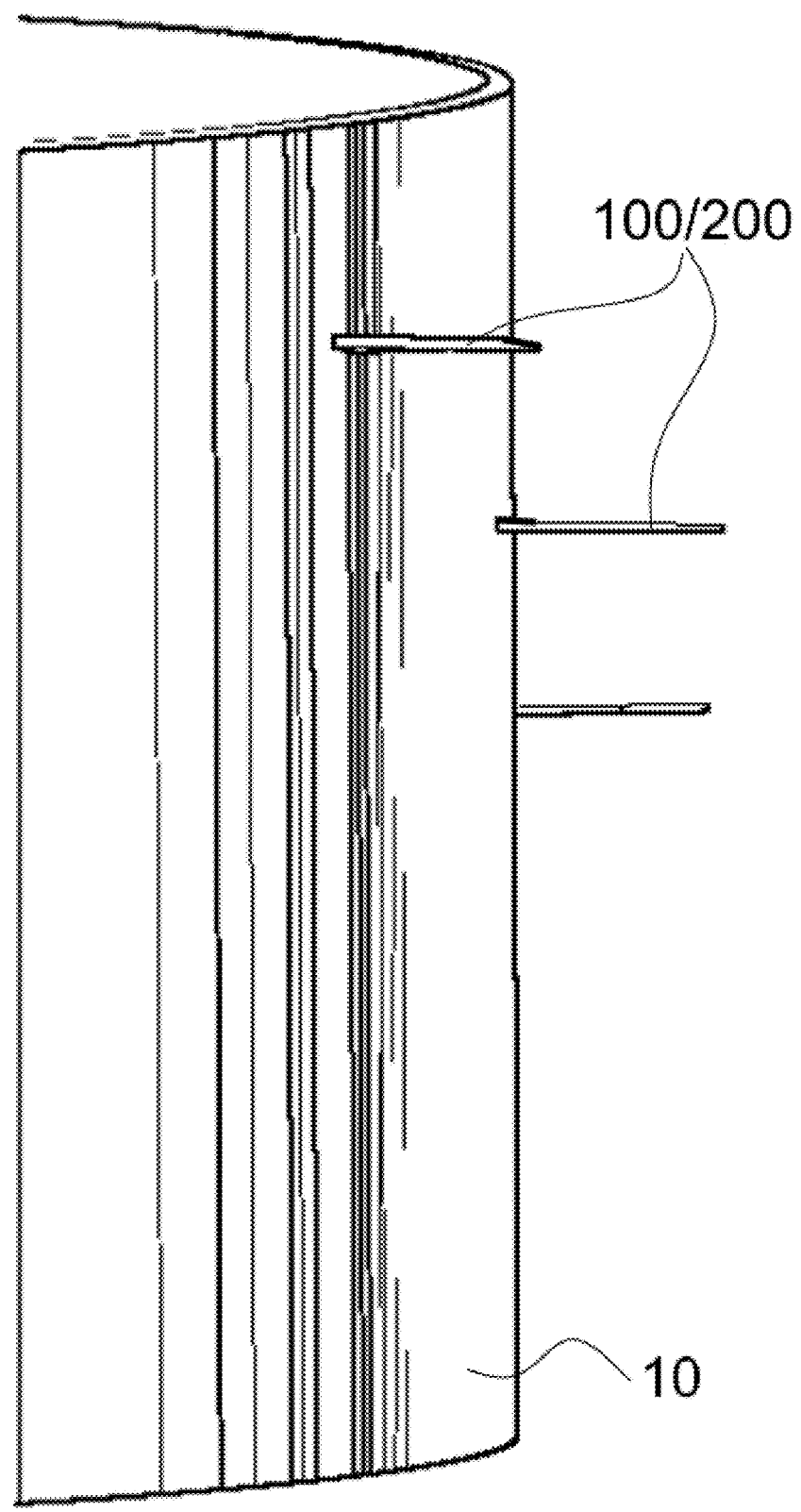
FIG. 6 is an illustration of an example embodiment flow measurement system using several acoustic flow meters.

In the instance that extension 101 has a natural frequency bandwidth that covers only a subset of potential flow rates of interest, multiple extensions 101 may be used, and/or multiple example embodiment acoustical flowmeters 100 may be implemented, with varying natural frequencies to cover a flow rate range of interest. For example, as shown in FIG. 6, multiple example embodiment flowmeters 100 having differing extension characteristics may be mounted on core shroud 10 in a downcomer space to measure flow rates from startup, to steady-state operations, to transient conditions. Example embodiment flowmeters 100 may each include their own acoustical pickup specifically tuned to their unique resonance bandwidth or may share vibration detectors and communicative connectivity among each other.

Figure 5:
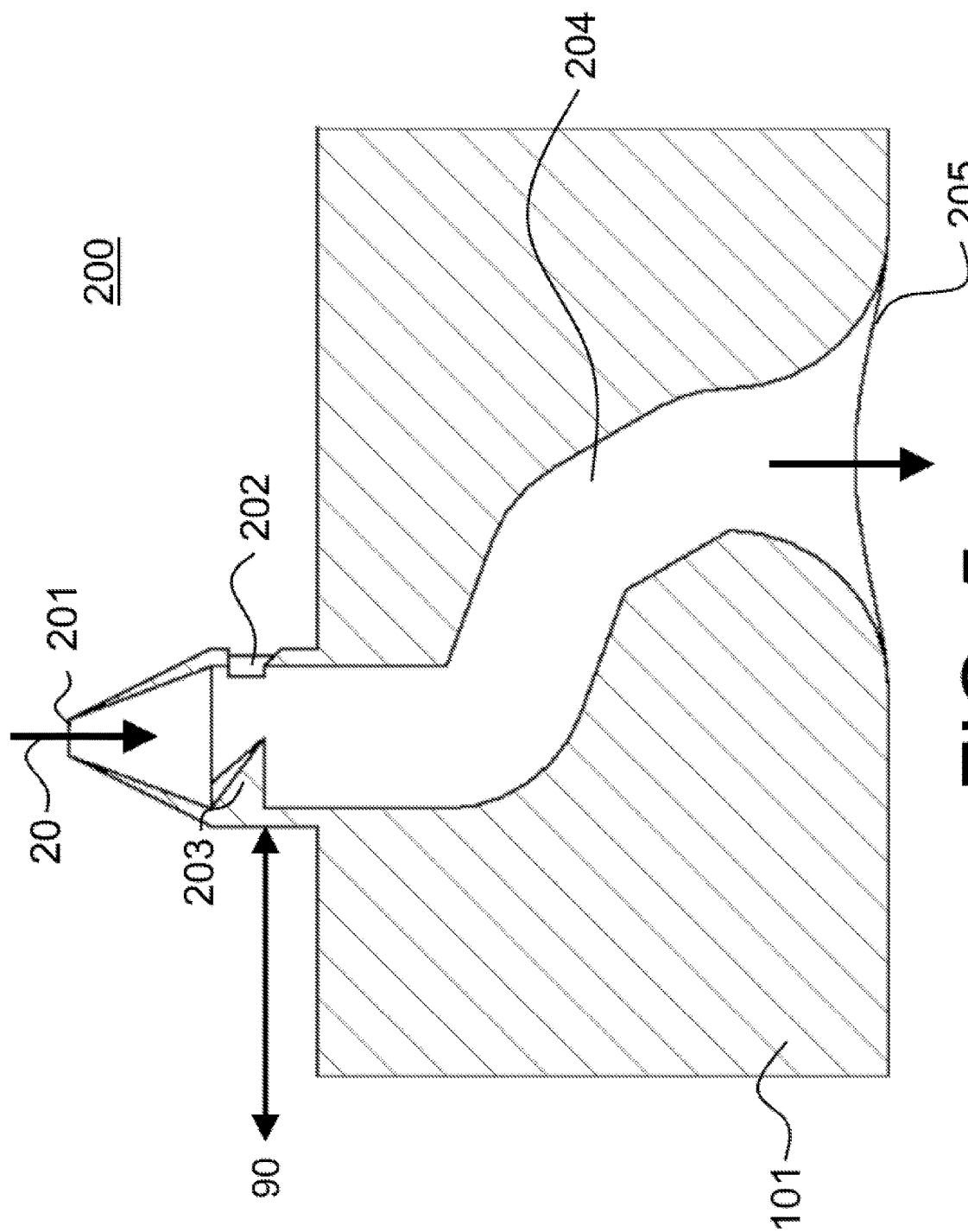
FIG. 5 is a profile section of another example embodiment acoustic flow meter.

As shown in FIG. 2, example embodiment flowmeter 100 may include another example embodiment flowmeter 200. Alternatively, example embodiment flowmeter 200 may be free-standing, without the operation of flowmeter 100. As shown in FIG. 5, example embodiment flowmeter 200 includes an internal passage 204 that allows fluid flow 20, such as liquid coolant in a downcomer annulus, to pass through flowmeter 200. Internal passage 204 may be inside extension 101, for example.

Example embodiment flowmeter 200 may include a top opening 201 that allows fluid flow 20 to enter flowmeter 200. Example embodiment flowmeter 200 may expand, much like a pipe organ design, in direction of flow 20, to a wedge 203 interrupting flow 20 at opening 202. The combination of expansion following top opening 201, wedge 203, and opening 202 causes flow 20 to vortex and be partially expelled through opening 202. The remainder of the flow may pass down and out of example embodiment flowmeter 200 via passage 204.

Figure 7:
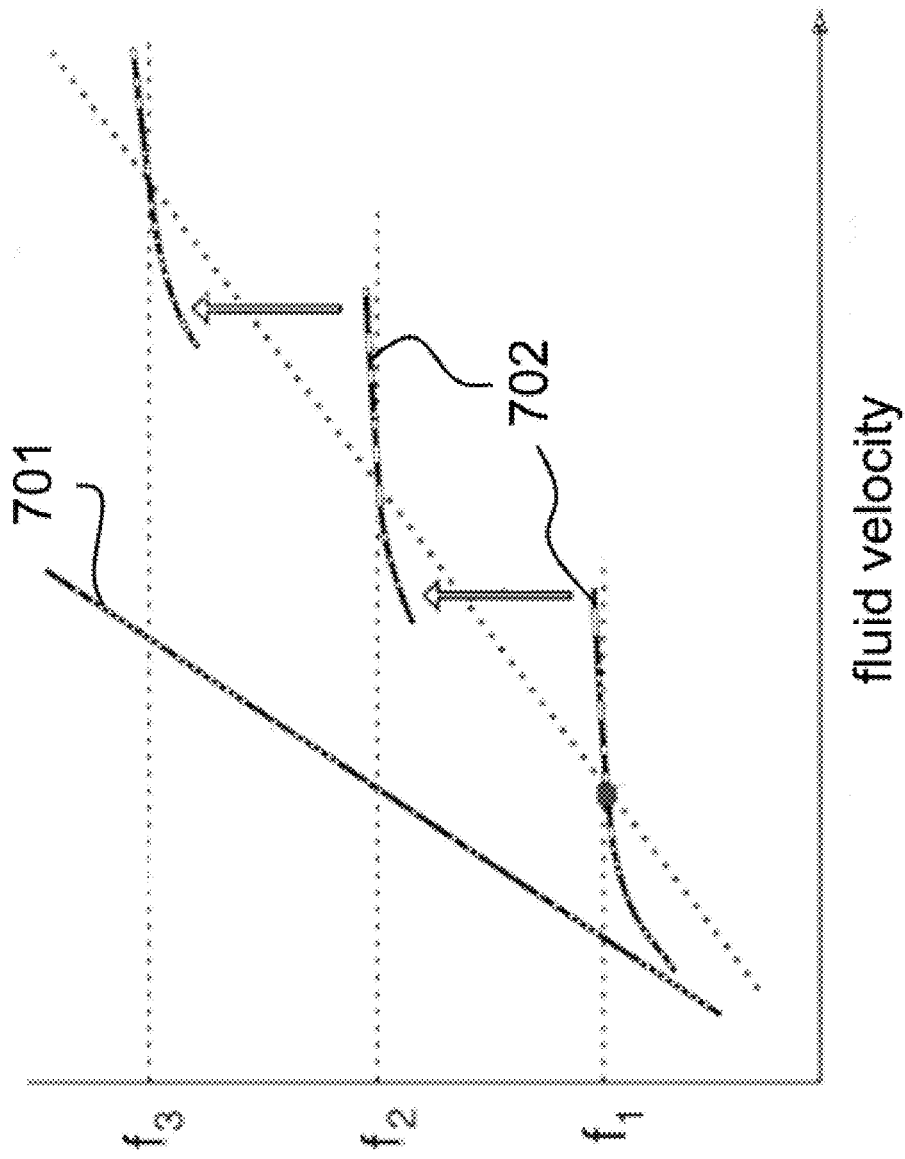
FIG. 7 is a graph of an example empirical relationship between Strouhal and Reynolds numbers for a fluid flow.

The vorticing inside example embodiment flowmeter 200 creates a standing wave in flowmeter 200, forcing vibration of flowmeter 200 at a frequency dependent on velocity of fluid flow 20. As shown in FIG. 7, the velocity of the fluid alone may be determined from a linear relationship 701 between flow velocity and frequency produced in wedge 203 used alone. Alternatively, as shown in FIG. 7, the frequency produced in example embodiment 200 including internal passage 204 like a pipe will jump between harmonic levels 702 based on flow velocity. The relationship between different frequencies and flow speed ranges is given by:

$$f_n = n * v / 2L \quad (5)$$

where $f_n$ is the vibrational frequency, v is the speed of sound in the fluid, L is the length of passage 240, and n is the node, or number of the harmonic, associated with fluid flow speed through the pipe.

A vibration detector 90 can detect vibration in example embodiment flowmeter 200 through the same type of placement and/or calibration as with example embodiment flowmeter 100 for the frequencies expected of example embodiment flowmeter 200. Knowing the length of passage 240, the speed of sound in the flowing coolant from its type, temperature, and pressure; and the detected vibrational or oscillating frequency of example embodiment flowmeter 200, the harmonic number n can be determined using a local or remote processor. As seen in FIG. 7, each harmonic level 702 is associated with a distinct range of flow velocities into example embodiment flowmeter 200, which may be determined empirically through observation of the harmonic range or by nodal analysis of flowmeter harmonics. By determining the frequency, $f_n$, the matching flow rate range can be established and thus independently measured in a nuclear reactor.

As shown in FIG. 5 example embodiment acoustic flowmeter 200 may include an expanding or flared opening 205 for passage 204. The increased area of opening 205 may better conduct sound waves generated by resonance in example embodiment acoustic flowmeter 200 into surrounding media for pickup by vibration detector 90. Passage 204 may also be S-shaped or curved to lengthen its flow path, thus lowering the frequency $f_n$ as shown by equation (5). A lower frequency may be more easily detectable or discriminated from ambient noise and vibration by detector 90. Similarly, passage 204 may be reconfigured into any longer or shorter shape to suit the needs of vibration detection while ensuring fluid through-flow. For example, passage 204 may be completely straight and lack any flared opening 205 for manufacturing simplicity, while still functioning as an acoustic flowmeter.

All elements of example embodiment flowmeter 200 may be additively manufactured into extension 101 of example embodiment flowmeter 100 through machining, molding, welding, etc. components of each example together as shown in FIG. 5. Any number of example embodiment acoustical flowmeters 200 may be used in a single extension, or from multiple extensions. Different acoustical flowmeters 200 may include different lengths, wedge shapes, or other characteristics to cover different flow rates with frequency nodes and/or produce different frequencies for detection and verification.

When used together, example embodiment flowmeters 100 and 200 may be used to verify each other and ensure a fluid velocity reading from one falls within an acceptable range of another. Additionally, because example embodiment flowmeter 200 will not resonate when subjected to radically-different densities in flow 20, such as two-phase flow containing steam, flowing into opening 201 while example embodiment flowmeter 100 will vibrate in 2-phase flow, a working/non-working disparity between example embodiment flowmeters 100 and 200 using a same extension may indicate the presence of two-phase flow at a particular location. Such two-phase flow may alert operators to an undesirable condition, such as steam dryer faults, feedwater overheating, shroud leakage, etc. Alternatively, each example embodiment acoustic flowmeter 200 may be its own structure independently mounted in a flow 20 of interest, without use of any example embodiment acoustical flowmeter 100.

Example embodiments and methods thus being described, it will be appreciated by one skilled in the art that example embodiments may be varied and substituted through routine experimentation while still falling within the scope of the following claims. For example, although example embodiments are discussed in usage with purified water flowing in an annular downcomer, a variety of different coolant types and flow passages are compatible with example embodiments and methods simply through proper dimensioning and material/length selection of example embodiments—and fall within the scope of the claims. Such variations are not to be regarded as departure from the scope of these claims.

What is claimed is:

1. An acoustic flowmeter for use in a downcomer annulus of a nuclear reactor, the acoustic flowmeter comprising:
    a solid material defining a passage with a top opening and exit through which a fluid can flow, wherein the top opening has a smaller area than the passage;

an extension extending into the passage positioned with a side opening in the passage, wherein the extension and the side opening are configured to cause vorticing in the flow and to cause fluid to flow through the side opening, so as to create a standing wave in the passage; and a vibration detector paired with the solid material, wherein the vibration detector is configured to detect an oscillation in the flowmeter caused by the standing wave and report a frequency of the oscillation.

2. The acoustic flowmeter of claim 1, wherein the passage widens at the exit.

3. The acoustic flowmeter of claim 1, wherein the passage includes two 90-degree bends.

4. The acoustic flowmeter of claim 1, further including:
a computer processor coupled with the vibration detector, wherein the computer processor is configured to calculate a flow rate of the fluid from the frequency, based on a length of the passage and a harmonic number of the oscillation.

5. The acoustic flowmeter of claim 1, wherein the extension and the side opening are at a same level in a direction of flow in the passage so that the extension and vorticing cause fluid to flow out of the side opening.

6. The acoustic flowmeter of claim 5, wherein the passage includes a widening section past the top opening of the passage in the direction of flow, and wherein the same level of the extension and the side opening is past the widening section in the direction of flow.

7. The acoustic flowmeter of claim 6, wherein the widening section is frustoconical.

8. The acoustic flowmeter of claim 7, wherein the vibration detector is an acoustical pickup outside the downcomer annulus.

9. The acoustic flowmeter of claim 5, wherein a space in the passage defined between the extension and the side opening at the same level is larger than the top opening of the passage.

10. The acoustic flowmeter of claim 1, wherein the solid material is configured to be mounted in the downcomer annulus so as to extend into reactor coolant flow in the downcomer annulus.

11. An acoustic flowmeter system in a nuclear reactor, the system comprising:
a core shroud surrounding a core of the nuclear reactor;
a reactor pressure vessel, wherein an outer surface of the core shroud and an inner surface of the reactor pressure vessel form a downcomer annulus;
a solid material defining a passage with a top opening and exit through which a fluid can flow, wherein the top opening has a smaller area than the passage, wherein the solid material is in the nuclear reactor downcomer annulus secured to the core shroud and extends transversely into the downcomer annulus so as to direct fluid flow from the downcomer annulus into the passage;
an extension extending into the passage positioned with a side opening in the passage, wherein the extension and the side opening are configured to cause vorticing in the flow and to cause fluid to flow through the side opening, so as to create a standing wave in the passage; and
a vibration detector paired with the solid material, wherein the vibration detector is configured to detect an oscillation in the flowmeter caused by the standing wave and report a frequency of the oscillation.

12. The acoustic flowmeter of claim 1, further including:
a computer processor coupled with the vibration detector and configured to calculate a flow rate of the fluid from the frequency, wherein the computer processor and the vibration detector are remote from the solid material.

* * * * *